(12) United States Patent
Wimmer et al.

(10) Patent No.: US 10,494,234 B2
(45) Date of Patent: Dec. 3, 2019

(54) CRANE CONTROLLER

(71) Applicant: Palfinger AG, Bergheim bei Salzburg (AT)

(72) Inventors: Eckhard Wimmer, Hof bei Salzburg (AT); Paul Reiter, Bergheim (AT)

(73) Assignee: PALFINGER AG, Salzburg (AT)

( * ) Notice: Subject to any disclaimer, the term of this patent is extended or adjusted under 35 U.S.C. 154(b) by 0 days.

(21) Appl. No.: 15/843,816

(22) Filed: Dec. 15, 2017

(65) Prior Publication Data

US 2018/0105402 A1 Apr. 19, 2018

Related U.S. Application Data

(63) Continuation of application No. PCT/AT2016/050233, filed on Jun. 24, 2016.

(30) Foreign Application Priority Data

Jun. 24, 2015 (AT) .......................... GM 50125/2015

(51) Int. Cl.
*B66C 15/06* (2006.01)
*B66C 23/00* (2006.01)
(Continued)

(52) U.S. Cl.
CPC ............ *B66C 15/065* (2013.01); *B66C 23/54* (2013.01); *B66C 23/905* (2013.01); *B60P 1/54* (2013.01); *B66C 13/48* (2013.01)

(58) Field of Classification Search
CPC ..... B66C 15/065; B66C 22/54; B66C 23/905; B66C 13/48; B60P 1/54
(Continued)

(56) References Cited

U.S. PATENT DOCUMENTS

| 3,854,128 A | 12/1974 | Yamagishi |
| 4,052,602 A | 10/1977 | Horn et al. |

(Continued)

FOREIGN PATENT DOCUMENTS

| AT | 14237 | 6/2015 |
| DE | 1 935 791 | 5/1971 |

(Continued)

OTHER PUBLICATIONS

International Search Report dated Oct. 4, 2016 in International (PCT) Application No. PCT/AT2016/050233.

(Continued)

*Primary Examiner* — Marthe Y Marc-Coleman
(74) *Attorney, Agent, or Firm* — Wenderoth, Lind & Ponack, L.L.P.

(57) ABSTRACT

A crane controller for a crane includes: a sliding position sensor for sensing a sliding position of a crane sliding arm, and a memory for storing entries for limit values for an operating parameter of the crane characteristic of the instantaneous crane load. Entries for maximum permissible limit values are stored in the memory for at least two sliding positions of the crane sliding arm. The crane controller also has an overload monitoring means, and a limit value for at least one operating parameter of the crane can be specified by the overload monitoring means of the crane controller. The limit value is specified by the overload monitoring means based on the stored entries according to the sliding position of the crane sliding arm. A limit value between the stored entries with respect to magnitude can be specified for a further sliding position between the stored sliding positions of the crane sliding arm.

20 Claims, 11 Drawing Sheets

(51) Int. Cl.
*B66C 23/90* (2006.01)
*B60P 1/54* (2006.01)
*B66C 13/48* (2006.01)

(58) Field of Classification Search
USPC .......................................................... 701/50
See application file for complete search history.

(56) References Cited

U.S. PATENT DOCUMENTS

| | | | |
|---|---|---|---|
| 4,614,476 A * | 9/1986 | Mello Ribeiro Pinto | .................. A01D 87/003 172/777 |
| 5,730,305 A | 3/1998 | Ichiba et al. | |
| 2008/0217279 A1 | 9/2008 | Gelies et al. | |
| 2017/0029252 A1 | 2/2017 | Deimer | |

FOREIGN PATENT DOCUMENTS

| | | |
|---|---|---|
| DE | 2 263 122 | 7/1973 |
| DE | 29 10 057 | 9/1980 |
| EA | 200801112 | 8/2008 |
| JP | 2002-241100 | 8/2002 |
| RU | 2 145 568 | 2/2000 |
| RU | 56 363 | 6/2006 |
| WO | 2008/143584 | 11/2008 |

OTHER PUBLICATIONS

Search Report dated Apr. 14, 2016 in Austrian Application No. GM 50125/2015, with English translation.

* cited by examiner

CRANE CONTROLLER

BACKGROUND OF THE INVENTION

The present invention relates to a crane controller for a crane, and a crane with such a crane controller.

In the state of the art, it is generally known to equip hydraulic loading cranes with an articulated attachment arm, a so-called "jib". With such an additional attachment arm, which is mounted on the foremost crane extension arm of the crane arm extension of the loading crane, the reach or lift height of a loading crane can be increased. As such, an articulated attachment arm on the crane arm extension exerts an additional moment on the crane, the retraction state of a crane arm extension with an articulated attachment arm must be included in the assessment of the current capacity utilization of the crane. An overload monitoring means usually distinguishes whether the foremost crane extension arm of the crane arm extension is in a retracted state or not and, as a function of this, a switch is made between two limit values for an operating parameter of the crane. In practice, this can be effected via a switch interacting with the foremost crane extension arm with two switch positions, by which the crane controller can specify limit values for an operating parameter of the crane.

A disadvantage of such a crane controller is, on the one hand, the abrupt transition from, for example, a high limit value of a permissible operating parameter of the crane to a reduced limit value of the operating parameter and, on the other hand, a less efficient utilization of the potential capabilities of the crane because of the specification of limit values as a function of the retraction state of the crane arm extension.

The object of the invention is to provide a crane controller for a crane or to provide a crane in which the above-named disadvantages do not arise.

SUMMARY OF THE INVENTION

The above object is achieved by providing a crane controller as described below, and a crane with such a crane controller.

For at least one further extension position between the stored extension positions of the at least one crane extension arm, a limit value lying between the stored entries with respect to magnitude is specifiable. Therefore, the specification of the limit value can be more precisely adapted to the current extension position of the crane extension arm. It can thus also be possible that at least sectionwise, a limit value proportional to the current extension position can be specified. Thus, for example, in the case of a partially extended foremost crane extension arm of the crane arm extension, the crane can be utilized more efficiently, as optionally for such an extension position a limit value can be specifiable in the case of which a lifting process which would already represent an overload taking into account only the retraction state of the crane extension arm can still be carried out within the load limits.

Preferably, the crane controller has an articulation angle sensor for detecting the second articulation angle of the crane arm extension in a vertical plane. Entries for maximum permissible limit values are stored in the memory for at least two articulation angles of the crane arm extension, and the specification of the limit value by an overload monitoring means is effected as a function of the articulation angle. In addition to the extension position of the crane arm extension, the inclination of the crane arm extension—and thus the projection effectively resulting for the attachment arm—can thereby also be included in the specification of the limit value. Thus, for example, the specification for limit values of the crane load can be optimized for different articulation angle ranges, and thus a more efficient utilization of a crane can be made possible.

According to a preferred embodiment, a limit value lying between the stored entries with respect to magnitude can be specified for at least one further articulation angle between the stored articulation angles of the crane arm extension. It can thereby be achieved that the specification of limit values can be optimized for several articulation angle ranges or articulation angular positions and thus better adapted to the current crane geometry.

According to a further preferred embodiment, the attachment arm has at least two crane arms, and the two crane arms can assume different extension positions relative to each other. The crane controller has a further extension position sensor for detecting the extension position of the crane arms of the attachment arm. Entries for maximum permissible limit values are stored in the memory for at least two extension positions of the crane arms of the attachment arm, preferably for a substantially completely retracted extension position of the crane arms of the attachment arm and a substantially completely extended extension position of the crane arms of the attachment arm. The specification of the limit value by the overload monitoring means is effected as a function of the detected extension position of the attachment arm. In such an arrangement of a further attachment arm on a first attachment arm arranged on the crane arm extension, a so-called "jib-in-jib" configuration, the specification of the limit value by the overload monitoring means can be better adapted to the extension position or the extension position range of the attachment arm through detection and inclusion of the extension position of the first attachment arm.

Preferably, a limit value lying between the stored entries with respect to magnitude is specifiable for at least one further extension position between the stored extension positions of the crane arms of the attachment arm. The specification of a limit value can thereby be more precisely adapted to the current extension position of the attachment arm.

The crane controller can also have a further articulation angle sensor for detecting the third articulation angle of the attachment arm in a vertical plane. Entries for maximum permissible limit values are stored in the memory for at least two articulation angles of the attachment arm, and the specification of the limit value by the overload monitoring means is effected as a function of the detected articulation angle of the attachment arm. The specification of a limit value can thus, for example, also be effected as a function of the articulation angle range or the articulation angular position of the attachment arm.

It is advantageous if a limit value lying between the stored entries with respect to magnitude can be specified for at least one further articulation angle of the attachment arm between the stored articulation angles of the attachment arm. The specification of a limit value can thus be more precisely adapted to the current position of the attachment arm or the crane geometry.

It is advantageous if a further attachment arm, preferably a further articulated arm, can be arranged on the attachment arm at a fourth articulation angle. The functionality, reach, and the range of use of the crane can thereby be extended.

The further attachment arm has at least two crane arms, and the two crane arms can assume different extension positions relative to each other. The crane controller has a further extension position sensor for detecting the extension position of the crane arms of the further attachment arm, and entries for maximum permissible limit values are stored in the memory for at least two extension positions of the crane arms of the further attachment arm, preferably for a substantially completely retracted extension position of the crane arms of the further attachment arm and a substantially completely extended extension position of the crane arms of the further attachment arm. The specification of the limit value by the overload monitoring means is effected as a function of the detected extension position of the crane arms of the further attachment arm. Thus, even if the crane is equipped with a second attachment arm, a limit value adapted to its extension position can be specified for an operating parameter.

It is advantageous if a limit value lying between the stored entries with respect to magnitude is specifiable for at least one further extension position between the stored extension positions of the crane arms of the attachment arm. Thus, for example, at least in sections, a limit value proportional to the current extension position can be specified.

It is advantageous if the crane controller has a further articulation angle sensor for detecting the fourth articulation angle of the further attachment arm in a vertical plane. Entries for maximum permissible limit values are stored in the memory for at least two articulation angles of the further attachment arm, and the specification of the limit value by the overload monitoring means is effected as a function of the detected articulation angle of the further attachment arm. If the articulation angle is included, for example, the effective retrieval output of the further attachment arm can thereby be integrated in the specification of the limit value.

It is advantageous if a limit value lying between the stored entries with respect to magnitude is specifiable for at least one further articulation angle of the further attachment arm between the stored articulation angles of the further attachment arm. A limit value adapted to the current articulation position of the attachment arm can thereby be specified.

It is advantageous if, for different embodiments of attachment arms, in each case specific entries with limit values are stored in the memory. For differently dimensioned or differently equipped attachment arms, in each case limit values applying specifically to this embodiment can be stored in the memory. An optimum utilization, adapted to the respective crane equipment, of the lifting potential of a crane by the crane controller can thereby be made possible.

It is particularly advantageous if the extension position of the crane arms is detected by a distance measurement device. For each extension position of the crane arms, a value corresponding to this extension position can thereby be fed to the crane controller. Through a suitable distance measurement device, a resolution as precise as desired of the current extension position can be achieved. This can relate to the extension position of the crane arm extension and/or the extension position of the attachment arm.

Preferably, the operating parameter is the pressure in the hydraulic cylinder on the crane arm. As the pressure in the hydraulic cylinder, for example in the articulating cylinder, corresponds directly to the load affecting the crane, this operating parameter is particularly characteristic of the current capacity utilization of the crane. It is possible for the hydraulic pressure in one—for example the main cylinder— or also more hydraulic cylinders of the crane to be detected, and for a limit value or limit values to be specified for this by the overload monitoring means.

Preferably, the limit value for the at least one further extension position or the at least one further articulation angle can be determined by interpolation between the entries stored in the memory. A limit value lying between the stored entries with respect to magnitude can thereby be specified for at least one further extension position or at least one further articulation angle for which or for the range of which no specific entry is stored in the memory. It can therefore be made possible to specify, for any desired extension positions or any desired articulation angular positions, a limit value for an operating parameter adapted to this resulting crane position. An interpolation can also comprise the determination of a limit value lying outside the range of the stored entries, as this covers the inclusion of the stored values as supporting points.

Preferably, the interpolation is effected linearly. A further limit value can thereby be determined with little computational outlay. The progression can be continuous at least in sections and also monotonously decreasing.

Preferably, the interpolation is effected polynomially. A substantially arbitrary progression of the specification of the limit value as a function of the extension position or of the articulation angle can thereby be made possible. The progression can be continuous at least in sections and also monotonously decreasing.

Preferably, at least one control function of the crane controller can be restricted by the overload monitoring means as a function of the ratio of the detected operating parameter to the limit value for the operating parameter. An overload situation can thereby be avoided or prevented by the crane controller. The restriction of a control function can prevent exceeding or falling short of a limit value. This can comprise, for example, a limiting of the highest permissible pressure in a hydraulic cylinder or also the maximum permissible rate of change of an operating parameter of the crane.

A crane with a crane controller according to one of the described embodiments is also provided. Such a mobile crane, which can be formed for example as a loading crane or articulated arm crane for a vehicle, is characterized by an optimized utilization of the lifting potential with, at the same time, a high level of protection against overload situations.

BRIEF DESCRIPTION OF THE DRAWINGS

Further details and advantages of the present invention are explained in more detail below with the aid of the description of the figures with reference to the embodiments represented in the drawings, in which.

DETAILED DESCRIPTION OF THE INVENTION

Figure 1:
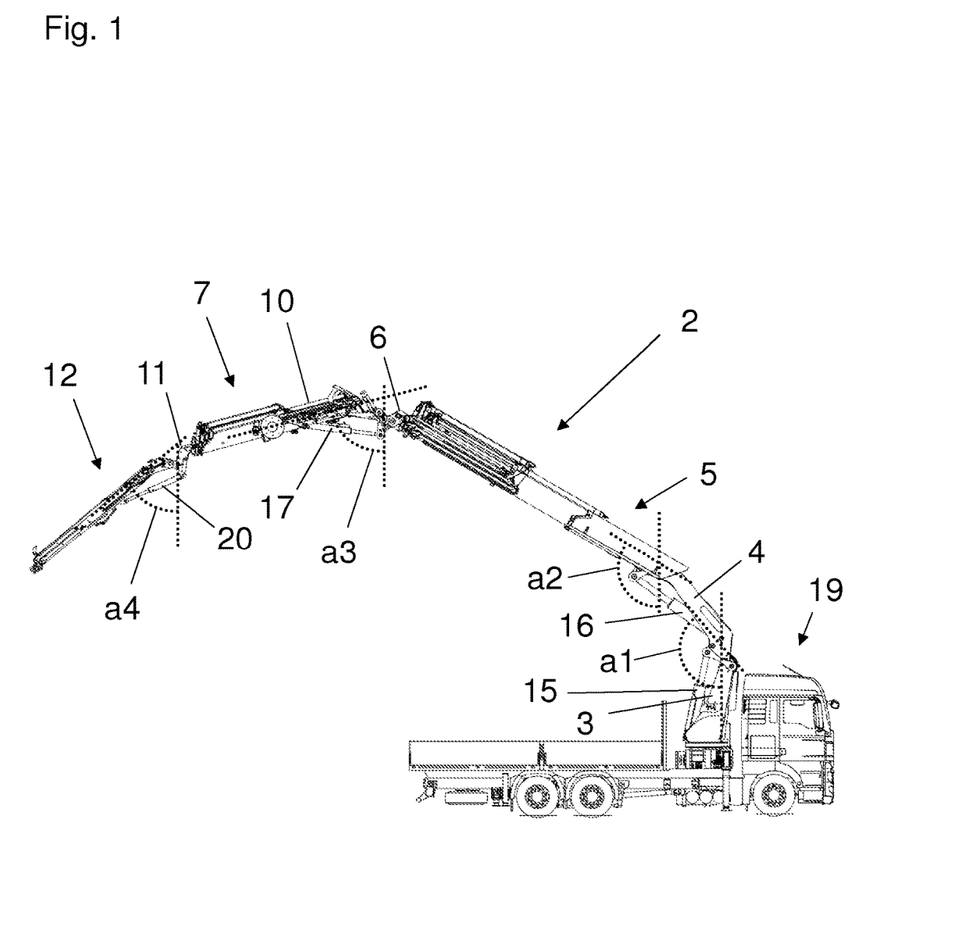
FIG. 1 is a side view of a mobile crane mounted on a vehicle.

FIG. 1 shows a vehicle 19 with a crane 2 mounted thereon, wherein the crane 2 has a first crane arm 3, often called a crane pillar, rotatable for example about a vertical axis, a second crane arm 4, often called a lifting arm, arranged thereon at a first articulation angle a1, a crane arm extension 5 arranged thereon at a second articulation angle a2 with several extension arms, an attachment arm 7 arranged on the foremost crane extension arm 6 of the crane arm extension 5 with an inner crane arm 10 and an outer crane arm 11, and a second attachment arm 12 arranged thereon at a fourth articulation angle a4. To pivot the second crane arm 4 relative to the first crane arm 3 in a vertical plane, a hydraulic cylinder 15 is provided. To pivot the crane arm extension 5 relative to the second crane arm 4 in a vertical plane, a first hydraulic cylinder 16 is provided. In order further to facilitate a pivoting of the first attachment arm 7 relative to the crane arm extension 5 in a vertical plane, a second hydraulic cylinder 17 is provided. Analogously thereto, finally, a third hydraulic cylinder 20 is provided to pivot the second attachment arm 12 in a vertical plane relative to the first attachment arm 7.

Figures 2A, 2B:
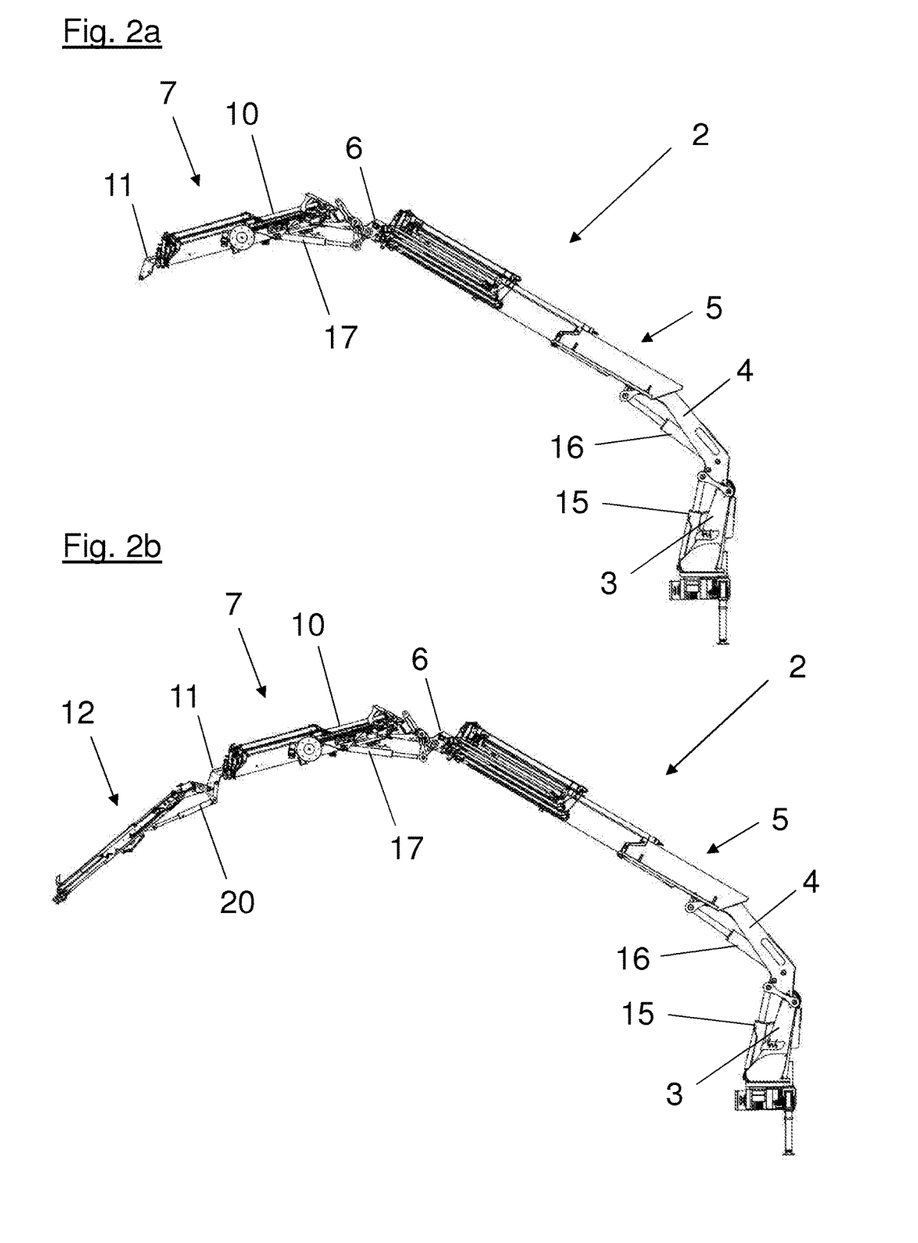
FIGS. 2a and 2b are side views of an embodiment of a loading crane.

FIG. 2a shows a detail view of an embodiment of a crane 2 with an attachment arm 7.

FIG. 2b shows a detail view of a crane 2 with a first attachment arm 7 and a second attachment arm 12.

Figure 3:
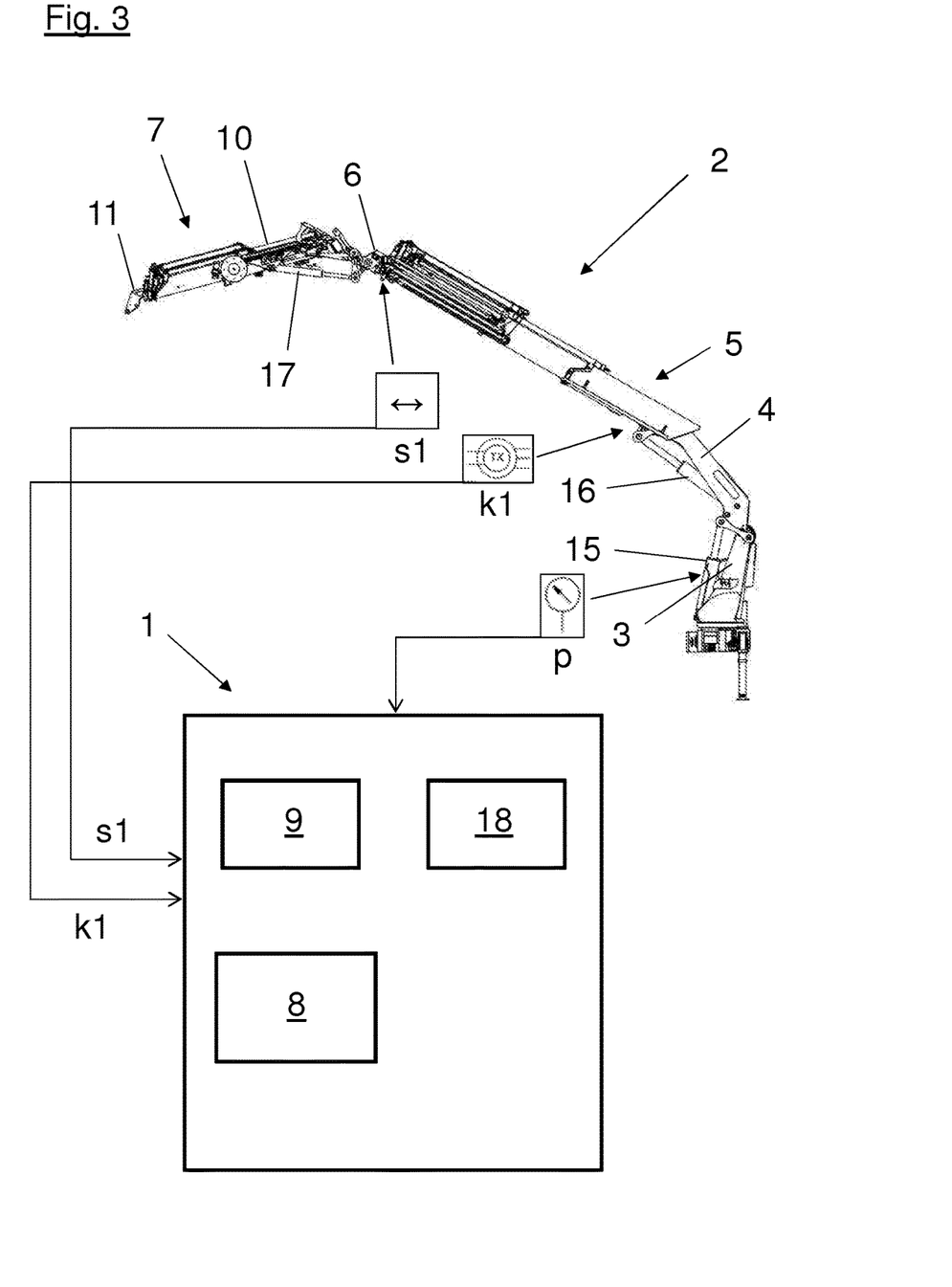
FIG. 3 is a side view of a mobile crane and a schematic representation of a crane controller with a crane sensor system.

In FIG. 3, an embodiment of a crane 2 is shown with an attachment arm 7 and a crane controller 1 with an associated crane sensor system. The crane controller 1 has a first extension position sensor s1 for detecting the extension position of the foremost crane extension arm 6 of the crane arm extension 5, a first articulation angle sensor k1 for detecting the articulation angular position of the crane arm extension 5 in a vertical plane, as well as, in this embodiment, a pressure sensor p for detecting the hydraulic pressure in a main hydraulic cylinder 15 of the crane 2. The values detected by the sensor system are fed to the crane controller 1 via corresponding connections, either a wired measurement line or a wireless connection. The crane controller 1 further has a memory 8 for storing therein limit values for at least one operating parameter of the crane 2 characteristic of the current capacity utilization of the crane, an overload monitoring means 9, through which a limit value for at least one operating parameter of the crane 2 is specifiable for the crane controller 1, and a processor 18. By specification of a limit value, the overload monitoring means 9 of the crane controller 1 can restrict one or more functions of the crane 2 such that the exceeding or also falling short of an operating parameter of the crane—for example the hydraulic pressure in one of the hydraulic cylinders 15, 16, 17, 20, the extension position or also the articulation angular position—can be prevented. The specification of a limit value can be effected as a function of the extension position of the crane arm extension 5 detected by the extension position sensor s1 and/or the articulation angular position of the crane arm extension 5 detected by the first articulation angle sensor k1, as well as also as a function of the extension position of the attachment arm 7 detected by a second extension position sensor s2 and/or the articulation angular position of the attachment arm 7 detected by a second articulation angle sensor k2.

Figure 4A:
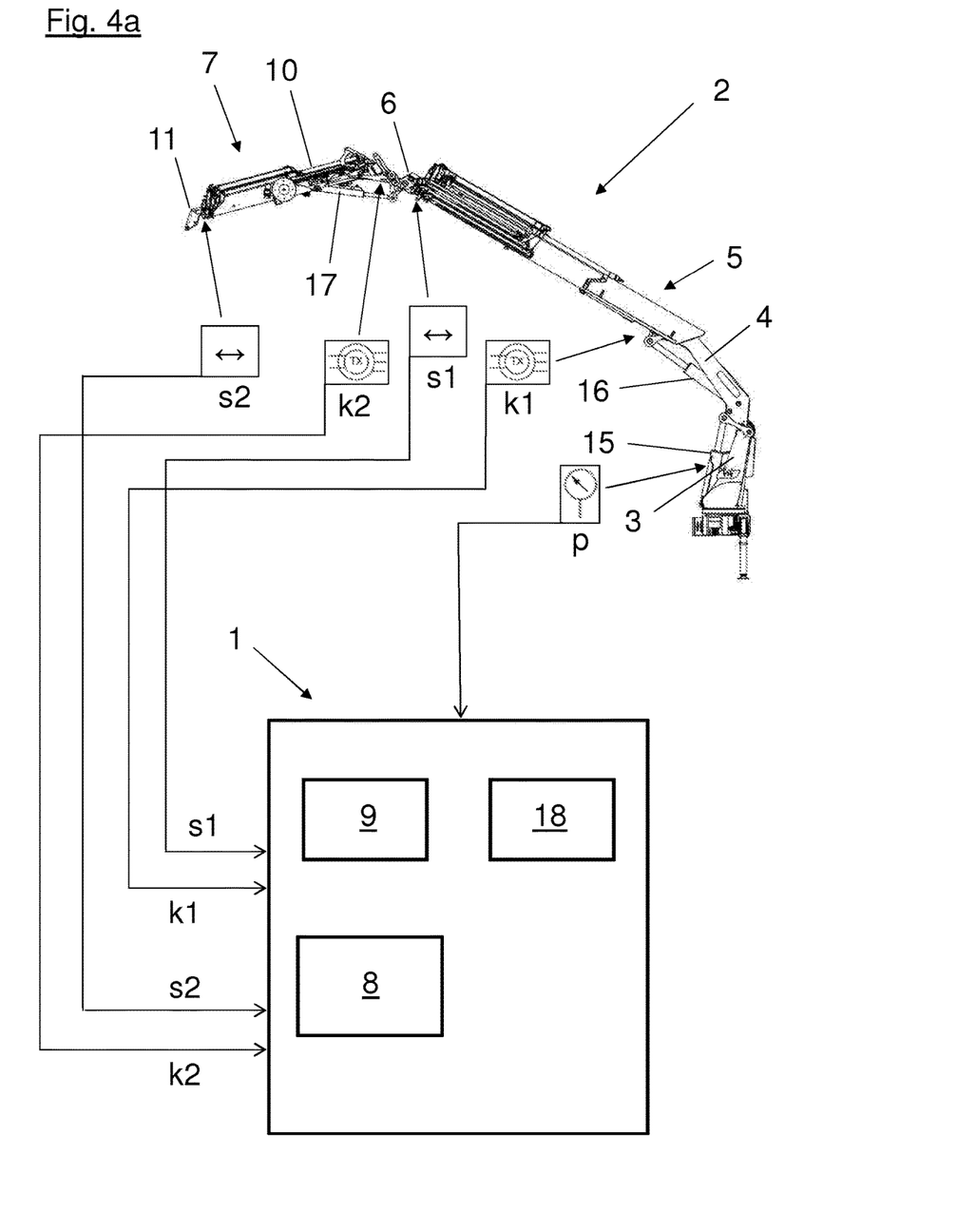
FIGS. 4a to 4c are side views of different embodiments of a loading crane with in each case a schematic representation of a crane controller with a crane sensor system.

FIG. 4a shows an embodiment of a crane 2 with a first attachment arm 7 and a schematic representation of a crane controller 1 with an associated crane sensor system. The crane sensor system comprises, as in the embodiment example shown previously in FIG. 3, firstly a first extension position sensor s1 for detecting the extension position of the crane arm extensions 5 and a first articulation angle sensor k1 for detecting the articulation angular position of the crane arm extension 5 in a vertical plane. Further, the crane sensor system in the embodiment of the crane 2 shown in FIG. 4 comprises a second extension position sensor s2 for detecting the extension position of the outermost crane arm 11 of the first attachment arm 7 and a second articulation angle sensor k2 for detecting the articulation angular position of the first attachment arm 7 in a vertical plane. In the embodiment shown, the crane sensor system additionally comprises a pressure sensor p for detecting the hydraulic pressure in the main hydraulic cylinder 15. The sensor data detected by the crane sensor system are fed to the crane controller 1 via suitable connections. The sensor data can there be compared by a processor 18 with entries stored in the memory 8 for limit values for operating parameters of the crane 2 characteristic of the current capacity utilization of the crane and corresponding to the sensor data and optionally corresponding limit values are specified by the overload monitoring means 9 for operating parameters as a function of the detected sensor data, thus for example as a function of the articulation angles a2, a3 of the crane arm extension 5 and the attachment arm 7 detected by the articulation angle sensors k1, k2 as well as the respective extension position of the extension arm 6 and the crane arms 10, 11 of the attachment arm 7.

Figure 4B:
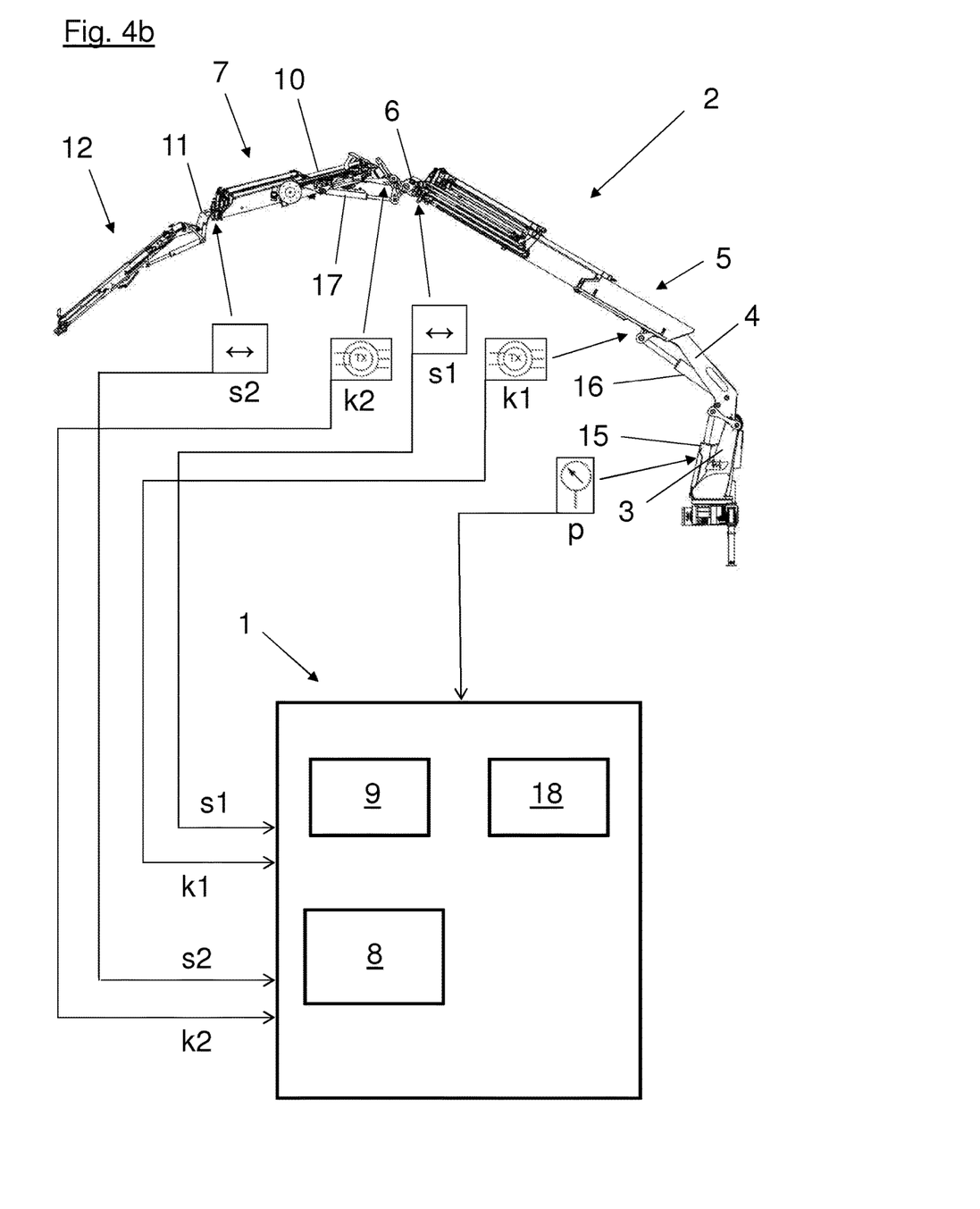

FIG. 4b shows a crane 2 with an attachment arm 7 arranged thereon and a further attachment arm 12.

Figure 4C:
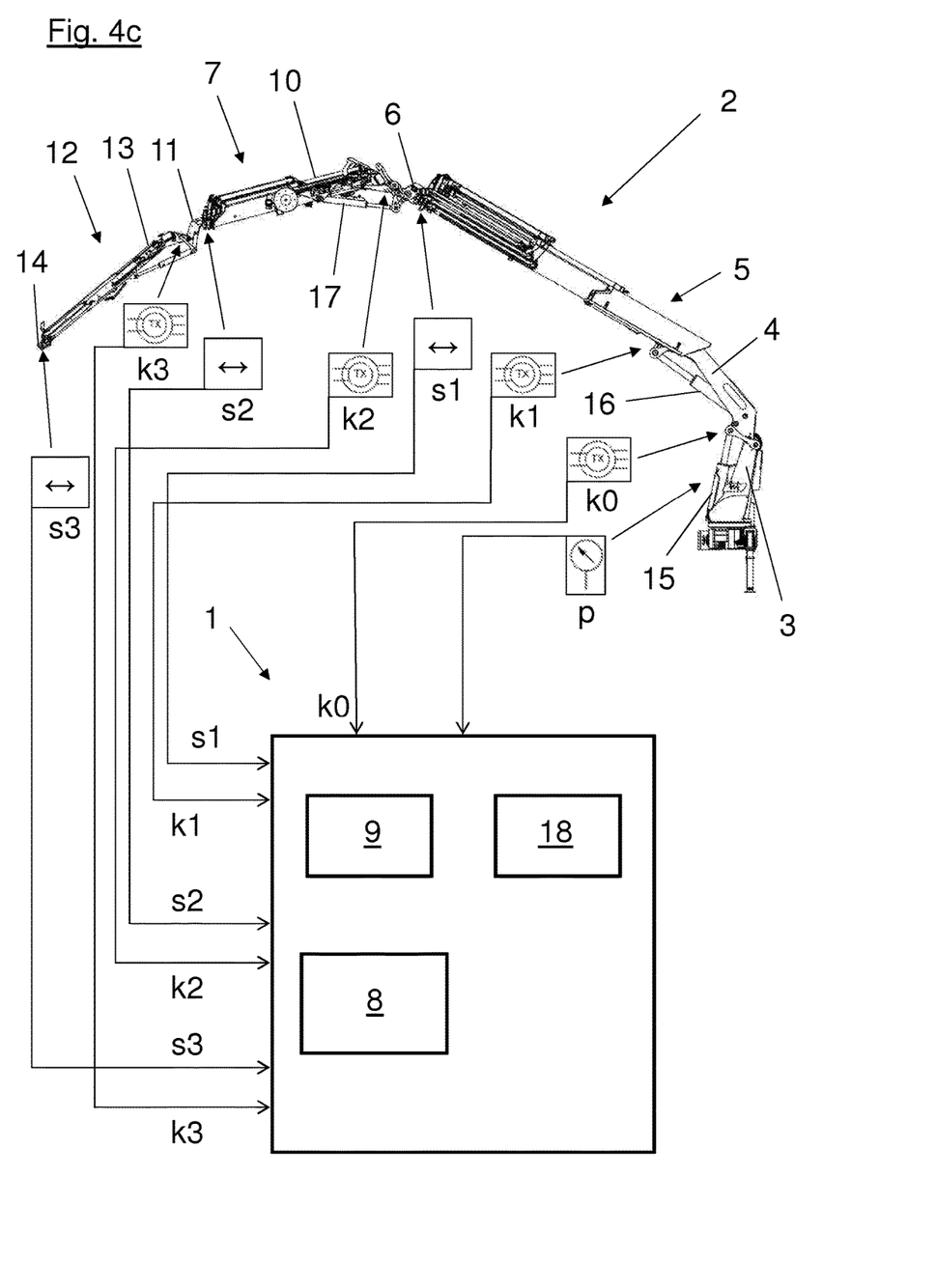

FIG. 4c shows an embodiment of a crane 2 with a first attachment arm 7, a further attachment arm 12 arranged thereon and a schematic representation of a crane controller 1 with an associated sensor system. The further attachment arm 12 has two crane arms 13, 14, which can assume different extension positions relative to each other. The crane sensor system comprises, as in the embodiment example shown previously in FIG. 4a, a first extension position sensor s1 and a second extension position sensor s2 for detecting the extension position of the crane arm extensions 5 and for detecting the extension positions of the crane arms 10, 11 of the attachment arm. Further, the crane sensor system comprises a first articulation angle sensor k1 and a second articulation angle sensor k2 for detecting the articulation angular position of the crane arm extension 5 in a vertical plane and for detecting the articulation angular position of the attachment arm 7 in a vertical plane. Further, the crane sensor system in the embodiment of the crane 2 shown in FIG. 4c comprises a third extension position sensor s3 for detecting the extension position of the crane arms 13, 14 of the further attachment arm 12 and a third articulation angle sensor k3 for detecting the articulation angular position of the further attachment arm 12 in a vertical plane. In addition, the embodiment of the crane 2 shown in FIG. 4c comprises a main articulation angle sensor k0 for detecting the first articulation angle a1, which the second crane arm 4 forms to the vertical. In the embodiment shown, the crane sensor system additionally again comprises a pressure sensor p for detecting the hydraulic pressure in the main hydraulic cylinder 15. The sensor data detected by the crane sensor system are fed to the crane controller 1 via suitable connections. The sensor data can there be compared by a processor 18 with entries stored in the memory 8 for limit values for operating parameters of the crane 2 characteristic of the current crane working load and corresponding to the sensor data and optionally corresponding limit values are specified by the overload monitoring means 9 for operating parameters as a function of the detected sensor data. In the embodiment shown, the specification of the limit value can thus be effected, for example, as a function of the articulation angles a2, a3, a4 of the crane arm extension 5, of the attachment arm 7 and of the further attachment arm 12 detected by the articulation angle sensors k1, k2, k3, as well as the respective extension position of the extension arm 6, the crane arms 10, 11 of the attachment arm 7 and the crane arms 13, 14 of the further attachment arm 12. The specification of a limit value for at least one operating parameter of the crane 2 can additionally be effected as a function of the first articulation angle a1 detected by the main articulation angle sensor k0.

Differing from the representation, the second crane arm 4 can also be formed telescopic. Such a telescopically designed second crane arm 4 can then take on the function of the crane arm extension 5 and an attachment arm 7 can optionally also be arranged thereon. Alternatively, it is also conceivable that the crane arm extension 5 is arranged directly on the first crane arm 3. It is readily possible to adapt the crane sensor system and the crane controller 1 to such conditions.

Figure 5A:
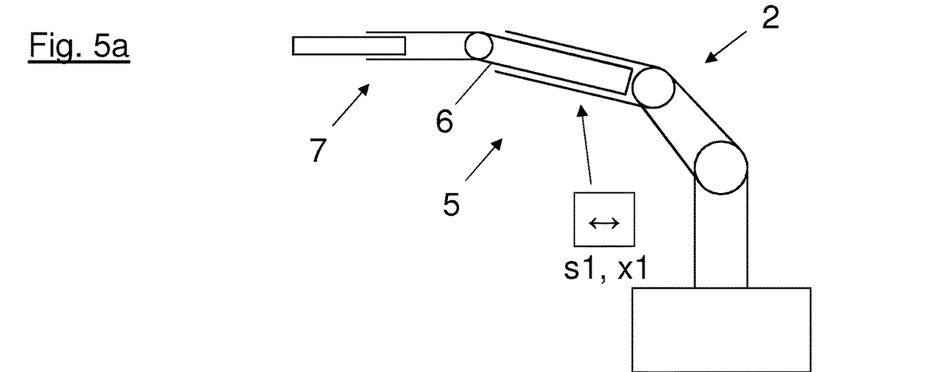
FIGS. 5a to 5c are schematic representations of a loading crane with different extension positions of the crane arm extension.
Figure 5B:
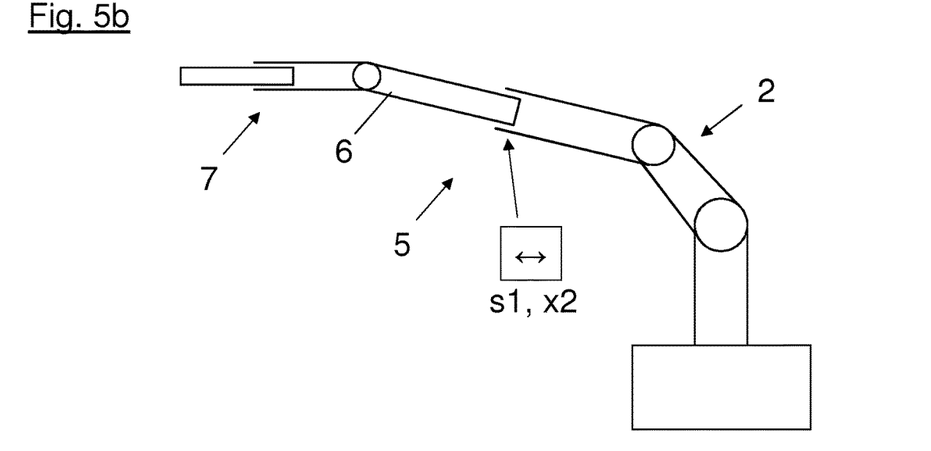
Figure 5C:
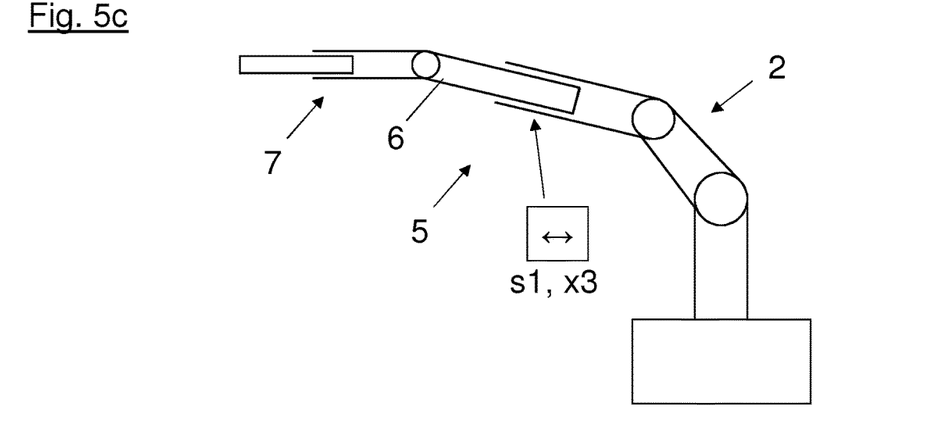

FIGS. 5a to 5c in each case show a schematic representation of a crane with a crane arm extension 5 with a crane extension arm 6 and an attachment arm 7 secured thereto with different extension positions x1, x2, x3 of the crane extension arm 6. A substantially completely retracted extension position x1 of the crane extension arm 6 of the crane arm extension 5 is shown in FIG. 5a. FIG. 5b on the other hand shows a substantially completely extended extension position x2 of the crane extension arm 6 of the crane arm extension 5. FIG. 5c shows an extension position x3 of the crane extension arm 6 of the crane arm extension 5 which is located between a substantially completely retracted and a substantially completely extended extension position. The extension position of the crane extension arm 6 of the crane arm extension 5 is in each case detected by the extension position sensor x1.

Figure 6A:
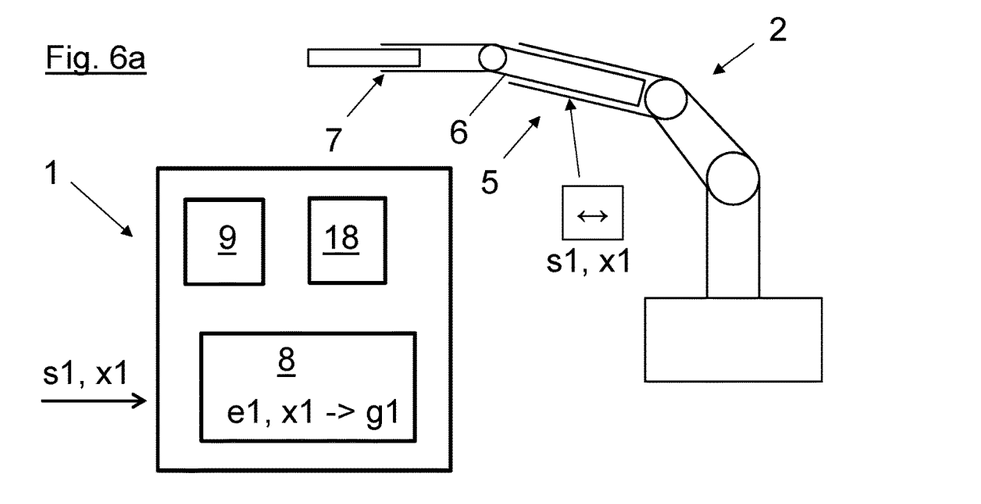
FIGS. 6a and 6b are schematic representations of a loading crane in different extension positions of the crane arm extension with a crane controller with a crane sensor system.
Figure 6B:
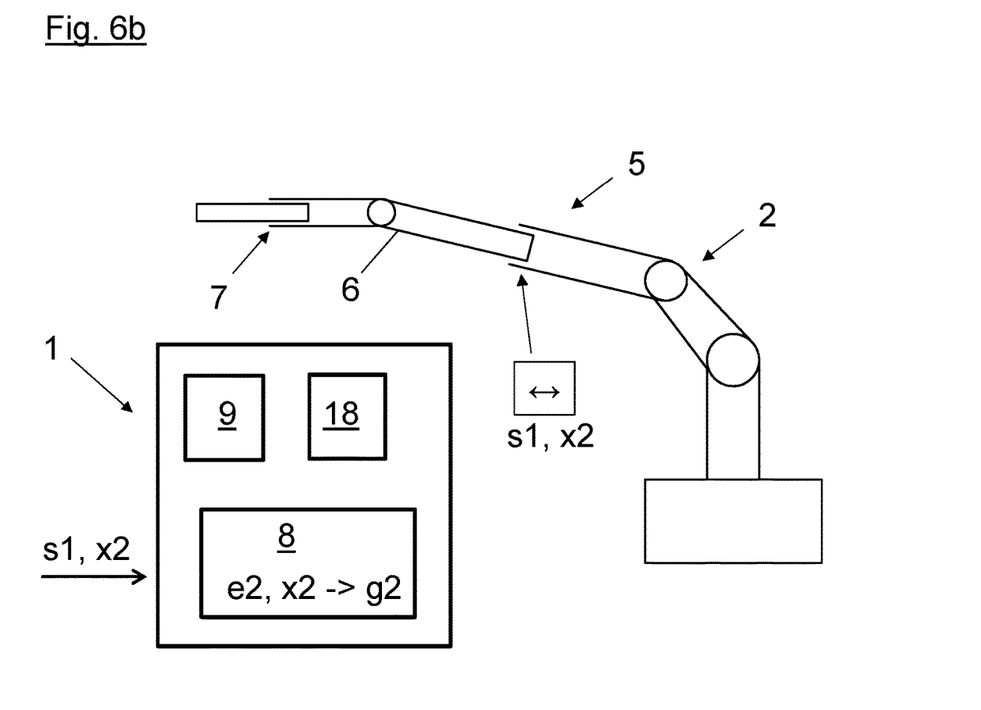

A schematic representation of a crane 2 with a crane arm extension 5 and an attachment arm 7 is shown in FIG. 6a. The crane extension arm 6 of the crane arm extension 5 is shown in a substantially completely retracted extension position x1, which is detected by the first extension position sensor s1. The measurement value associated with the extension position x1 is fed to the schematically shown crane controller 1 by the first extension position sensor s1. For this extension position x1, an associated entry e1 with the assigned limit value g1 is stored in the memory 8 of the crane controller 1. This limit value g1, which can represent for example a limit pressure for a hydraulic cylinder not shown here, can be specified by the overload monitoring means 9 as a limit value for an operating parameter of the crane 2. Analogously thereto, a crane 2 with a crane arm extension 5 and an attachment arm 7 is shown in FIG. 6b, wherein the crane extension arm 6 of the crane arm extension 5 is in a substantially completely extended extension position x2. The measurement value for the extension position x2 detected by the first extension position sensor s1 is fed to the crane controller 1. Regarding this extension position x2, an entry e2 to which a limit value e2 is assigned is stored in the memory 8.

Figure 7A:
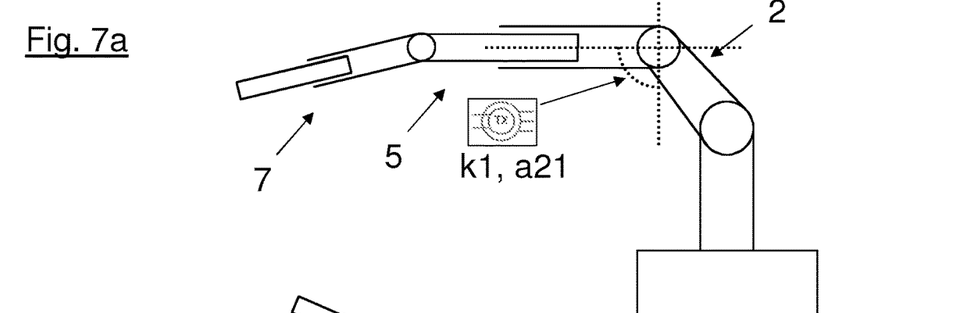
FIGS. 7a to 7c are schematic representations of a loading crane with different articulation angular positions of the crane arm extension.
Figure 7B:
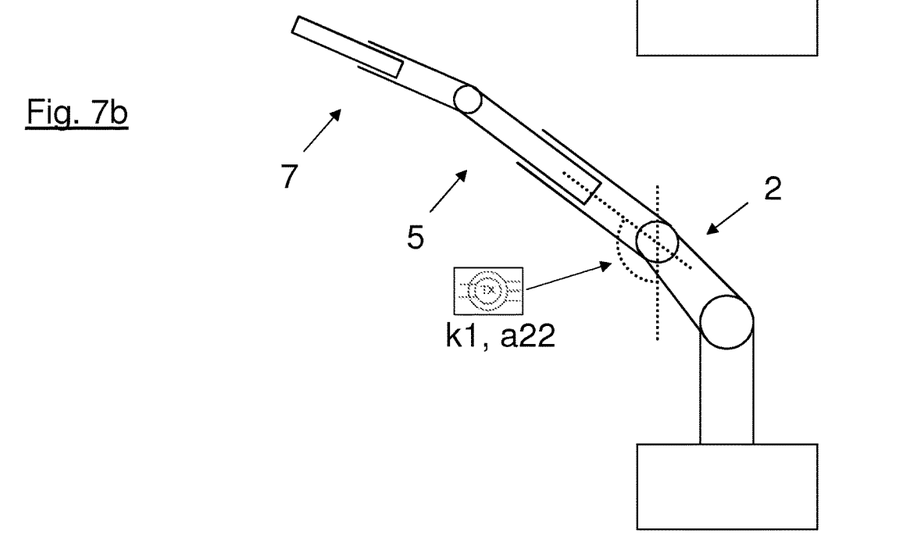
Figure 7C:
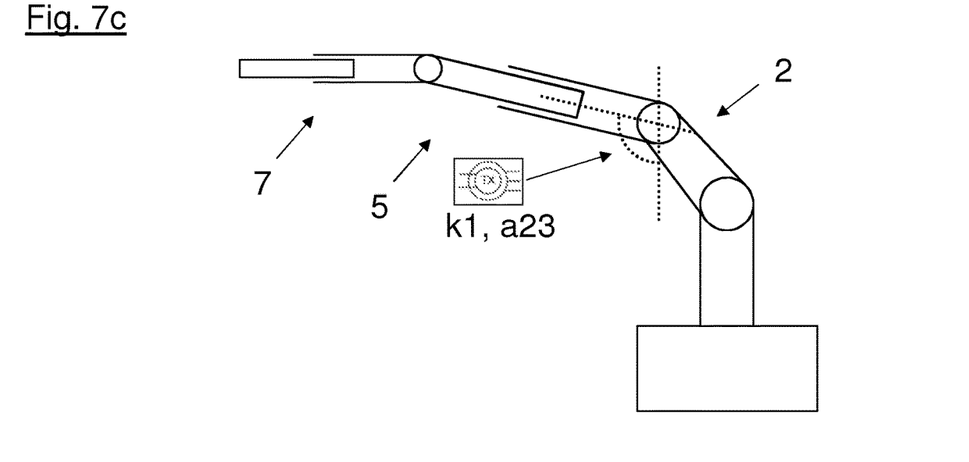

A schematic representation of a crane 2 with a crane arm extension 5 and an attachment arm 7 is shown in FIGS. 7a to 7c in each case, wherein the representations differ by different articulation angles a21, a22, a23 of the crane arm extension 5 in a vertical plane. For example, a position of the crane 2 in which the crane arm extension 5 is shown in a substantially horizontal position is shown in FIG. 7a. The associated articulation angle a21 is detected by the first articulation angle sensor k1. FIG. 7b shows a position of the crane in which the crane arm extension beyond the horizontal is activated. The associated articulation angle a22 is detected by the articulation angle sensor k1. In FIG. 7c the crane is shown in a position in which the crane arm extension 5 is arranged at an articulation angle a23 which is between the articulation angular positions shown previously in FIGS. 7a and 7b.

Figure 8A:
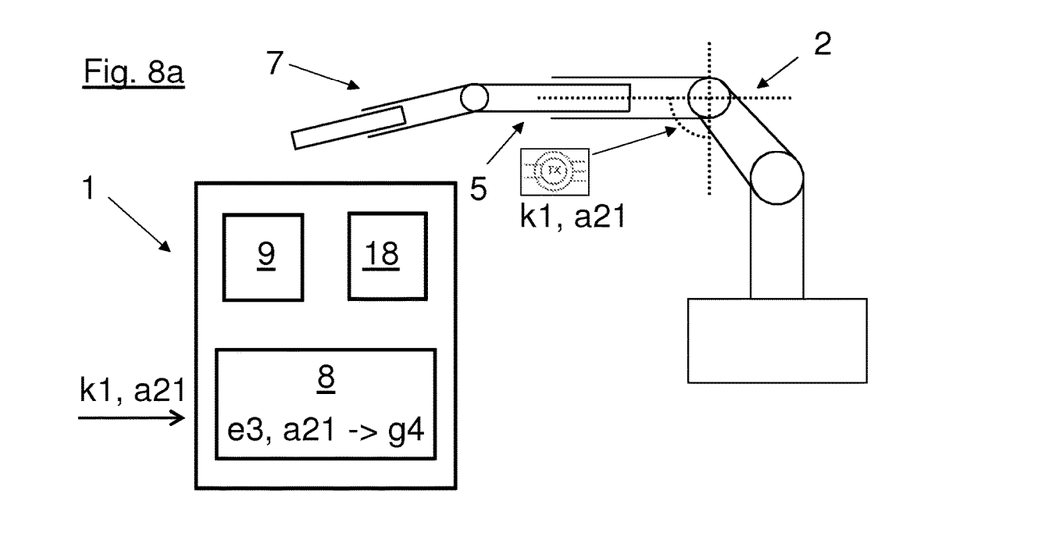
FIGS. 8a and 8b are schematic representations of a loading crane in different articulation angular positions of the crane arm extension with a crane controller with a crane sensor system.

FIG. 8a shows a schematic representation of a crane 2 with a crane arm extension 5 and an attachment arm 7 arranged thereon. The crane arm extension 5 is arranged at an articulation angle a21 detected by the first articulation angle sensor k1 which, in the embodiment shown, substantially corresponds to a horizontally placed crane arm extension 5. The measurement value detected by the articulation angle sensor k1 for the articulation angle a21 is fed to the crane controller 1, wherein an entry e3 associated with the articulation angle a21, which is assigned the limit value g4, is stored in the memory 8 of the crane controller 1. This limit value g4 can be specified by the overload monitoring means 9 of the crane controller 1 as a limit value for an operating parameter of the crane 2.

Figure 8B:
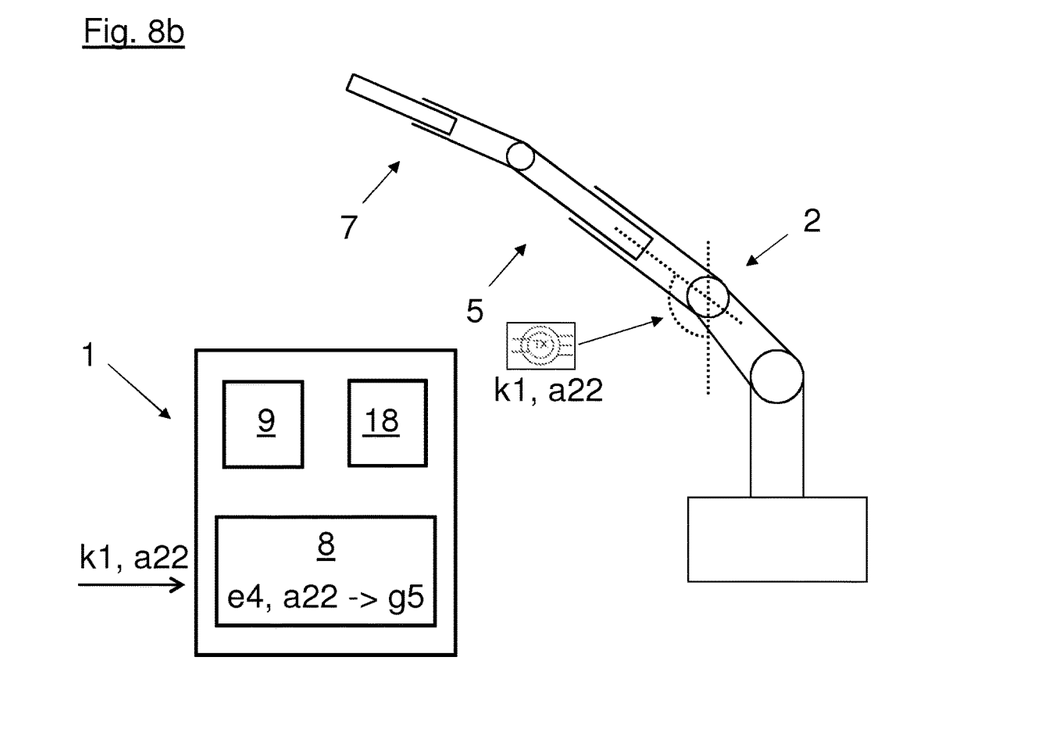

Analogously to FIG. 8a, a crane 2 is shown in a further articulation angular position a22 of the crane arm extension 5 in FIG. 8b. The measurement value detected by the first articulation angle sensor k1 for the articulation angle a22 is fed to the crane controller 1, wherein an entry e4 associated with this articulation angle a22, which is assigned the limit value g5, is stored in its memory 8.

By way of example, the specification of a further limit value for, in each case, an extension position in between corresponding entries in the memory 8 and an articulation angular position in between corresponding entries in the memory 8 is now to be explained with reference to the crane arm extension 5. It goes without saying that the statements can also be applied to other crane arms or crane extension arms or attachment arms of the crane 2.

Figure 9A:
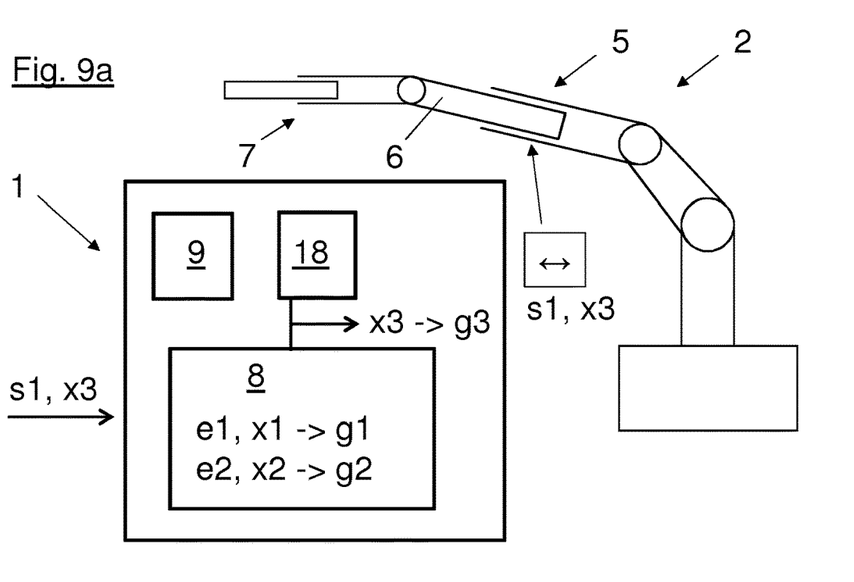
FIGS. 9a and 9b are further schematic representations of a loading crane with a crane controller with a crane sensor system.
Figure 9B:
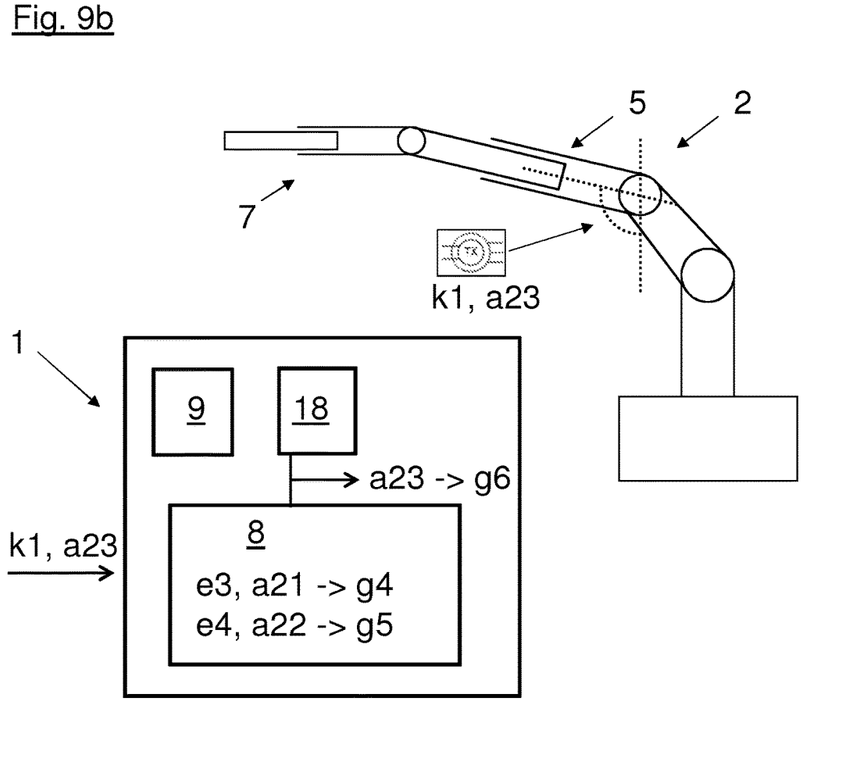

A crane position of a schematically represented crane 2, the associated extension position or articulation position of which lies between associated values stored in the memory 8 of the crane controller 1, is shown in FIGS. 9a and 9b in each case. Specifically, a crane 2 with a crane arm extension 5 and an attachment arm 7 is shown in FIG. 9a, wherein the crane extension arm 6 of the crane arm extension 5 is located in an extension position x3 corresponding to a partially extended or retracted position. The value detected by the first extension position sensor s1 for the extension position x3 is fed to the crane controller 1. In the crane controller 1 entries e1, e2 with associated limit values g1, g2 are stored in the memory 8 for two extension positions x1 and x2. The extension position x3 can be located, for example, between the stored extension positions x1 and x2 with respect to magnitude. Through an embodiment of the crane controller 1 according to the invention it is now possible to determine a limit value g3 lying between the stored limit values g1, g2 with respect to magnitude for the further extension position x3 between the stored extension positions x1, x2 of the crane extension arm 6 and to use this for the specification of a limit value for an operating parameter of the crane 2 by the overload monitoring means 9. The further limit value g3 for the further extension position x3 can be determined by the processing unit 18 of the crane controller 1 by an interpolation between the entries stored in the memory 8. The specification of a further limit value can be effected continuously for each extension position along the entire extension path of the crane extension arm 6 of the crane arm extension 5 or also only in sections or in steps at intervals. Thus, in contrast to a crane controller taking into account only the retracted state of a crane arm extension, in which only two limit values result over the extension path, a limit value optimally adapted to the current extension position can be determined and specified by the crane controller 1 for at least one operating parameter of the crane 2 from tables with entries stored in the memory 8.

Analogously thereto, a crane 2 with a crane arm extension 5 and an attachment arm 7 is shown in FIG. 9b, wherein the crane arm extension 5 is in a position characterized by the articulation angle a23 detected by the articulation angle sensor k1. The measurement value fed to the crane controller 1 for the articulation angle a23 in this embodiment lies, with respect to magnitude, between the articulation angular positions a21 and a22 stored in the memory 8 of the crane controller 1. Through an embodiment of the crane controller 1 according to the invention a further limit value g6, which lies between the stored limit values g4 and g5 with respect to magnitude, can be specified. It is possible, for example, for the further limit value g6 to be determined by the processing unit 18 of the crane controller 1 by an interpolation between the entries stored in the memory 8. Thus, it is possible for limit values for operating parameters, for which no entries of their own are stored in the memory 8, also to be able to be specified by the overload monitoring means 9 of the crane controller 1 for articulation angular positions of the crane arm extension 5.

In principle, it is also conceivable that, analogously to the previous statements for the crane arm extension 5, additional limit values can be determined and specified by the crane controller 1, for different extension positions and articulation angular positions—that are also not characterized with entries in the memory 8—of the attachment arm 7 and/or the further attachment arm 12 for an embodiment of a crane, such as is shown for example in FIG. 4a or FIG. 4c.

LIST OF REFERENCE NUMBERS 1 crane controller
2 crane
3 first crane arm
4 second crane arm
a1, a2, a3, a4 articulation angle
5 crane arm extension
6 crane extension arm
7 attachment arm
s1 extension position sensor
x1, x2, x3 extension positions
8 memory
e1, e2 entries
9 overload monitoring means
g1, g2, g3 limit values
k1 articulation angle sensor
a21, a22, a23 articulation angles
e3, e4 entries
g4, g5, g6 limit values
10, 11 crane arm
s2 extension position sensor
12 attachment arm
k2 articulation angle sensor
13, 14 crane arm
15, 16, 17 hydraulic cylinders
s3 extension position sensor
k3 articulation angle sensor
18 processing unit
19 vehicle
20 hydraulic cylinder
p pressure sensor

The invention claimed is:

1. A crane controller for a crane having a first crane arm, a second crane arm arranged on the first crane arm at a first articulation angle, and a crane arm extension arranged on the second crane arm at a second articulation angle, the crane arm extension including at least one crane extension arm operable to assume different extension positions, said crane controller comprising:
an extension position sensor for detecting an extension position of the at least one crane extension arm;
a memory for storing entries for limit values for at least one operating parameter of the crane characteristic of the current capacity utilization of the crane, the entries for limit values including entries for maximum permissible limit values stored in said memory for at least two extension positions of the at least one crane extension arm; and
wherein said crane controller is configured to:
specify a limit value for at least one operating parameter of the crane based on the stored entries as a function of the extension position of the at least one crane extension arm detected by said extension position sensor, and
specify a limit value lying between the stored entries with respect to a magnitude of the stored entries for at least one further extension position between the stored extension positions of the at least one crane extension arm.

2. The crane controller according to claim 1, further comprising an articulation angle sensor for detecting a second articulation angle of the crane arm extension in a vertical plane, said memory storing entries for maximum permissible limit values for at least two articulation angles of the crane arm extension, and said crane controller being further configured to specify the limit value as a function of the second articulation angle detected by said articulation angle sensor.

3. The crane controller according to claim 2, wherein said crane controller is further configured to specify a limit value lying between the stored entries with respect to magnitude for at least one further articulation angle between the stored articulation angles of the crane arm extension.

4. The crane controller according to claim 1, wherein the crane further has an attachment arm arranged on the crane arm extension at a third articulation angle, the attachment arm having at least two crane arms, and the at least two crane arms configured to assume different extension positions relative to each other, wherein said extension position sensor is a first extension position sensor, said crane controller further comprising:
a second extension position sensor for detecting an extension position of the at least two crane arms of the attachment arm;

wherein said memory stores entries for maximum permissible limit values for (i) a completely retracted extension position of the at least two crane arms of the attachment arm and (ii) a completely extended extension position of the at least two crane arms of the attachment arm, and wherein said crane controller is configured to specify the limit value as a function of the detected extension position of the at least two crane arms of the attachment arm.

5. The crane controller according to claim 4, wherein said crane controller is further configured to specify a limit value lying between the stored entries with respect to magnitude for at least one further extension position between the stored extension positions of the at least two crane arms of the attachment arm.

6. The crane controller according to claim 4, further comprising an articulation angle sensor for detecting the third articulation angle of the attachment arm in a vertical plane, wherein said memory stores entries for maximum permissible limit values for at least two articulation angles of the attachment arm, wherein said crane controller is configured to specify the limit value as a function of the third articulation angle of the attachment arm detected by said articulation angle sensor.

7. The crane controller according to claim 6, wherein said crane controller is further configured to specify a limit value lying between the stored entries with respect to magnitude for at least one further articulation angle of the attachment arm between the stored articulation angles of the attachment arm.

8. The crane controller according to claim 1, wherein the crane further has a first attachment arm arranged on the crane arm extension at a third articulation angle, and has a second attachment arm arranged on the first attachment arm at a fourth articulation angle, the second attachment arm having at least two crane arms, and the two crane arms are configured to assume different extension positions relative to each other, said extension position sensor is a first extension position sensor, said crane controller further comprising:

a second extension position sensor for detecting an extension position of the crane arms of the second attachment arm;

wherein said memory stores entries for maximum permissible limit values for (i) a completely retracted extension position of the crane arms of the second attachment arm and (ii) a completely extended extension position of the crane arms of the second attachment arm, and wherein said crane controller is configured to specify the limit value as a function of the detected extension position of the crane arms of the second attachment arm.

9. The crane controller according to claim 8, wherein said crane controller is further configured to specify a limit value lying between the stored entries with respect to magnitude for at least one further extension position between the stored extension positions of the crane arms of the second attachment arm.

10. The crane controller according to claim 8, further comprising an articulation angle sensor for detecting the fourth articulation angle of the second attachment arm in a vertical plane, wherein said memory stores entries for maximum permissible limit values for at least two articulation angles of the second attachment arm, wherein said crane controller is configured to specify the limit value as a function of the fourth articulation angle of the second attachment arm detected by said articulation angle sensor.

11. The crane controller according to claim 10, wherein said crane controller is further configured to specify a limit value lying between the stored entries with respect to magnitude for at least one further articulation angle of the second attachment arm between the stored extension positions of the crane arms of the second attachment arm.

12. The crane controller according to claim 1, wherein said memory stores specific entries with limit values for each crane having different attachment arms configuration.

13. The crane controller according to claim 1, further comprising a distance measurement device configured to detect the extension position of the at least one crane extension arm.

14. The crane controller according to claim 1, wherein the operating parameter is a pressure in a hydraulic cylinder mounted to the first crane arm.

15. The crane controller according to claim 1, wherein said crane controller is configured to determine the limit value for the at least one further extension position by linear interpolation or by a higher-order polynomial interpolation, between the entries stored in the memory.

16. The crane controller according to claim 1, wherein said crane controller is configured to restrict at least one control function of the crane controller as a function of a ratio of the operating parameter to the limit value for the operating parameter.

17. The crane controller according to claim 1, wherein the at least two extension positions of the at least one crane extension arm include (i) a completely retracted extension position of the crane extension arm, and (ii) a completely extended extension position of the crane extension arm.

18. An articulated arm crane comprising:
a first crane arm;
a second crane arm arranged on said first crane arm at a first articulation angle;
a crane arm extension arranged on said second crane arm at a second articulation angle, said crane arm extension including at least one crane extension arm operable to assume different extension positions; and
said crane controller according to claim 1.

19. The crane according to claim 18, further comprising an articulated attachment arm arranged on said crane arm extension at a third articulation angle.

20. The crane according to claim 19, wherein said articulated attachment arm is a first articulated attachment arm, said crane further comprising a second articulated attachment arm arranged on said first articulated attachment arm at a fourth articulation angle.

* * * * *